United States Patent
Wang et al.

(10) Patent No.: US 6,958,309 B2
(45) Date of Patent: Oct. 25, 2005

(54) HYDROTHERMAL PRETREATMENT FOR INCREASING AVERAGE PORE SIZE IN A CATALYST SUPPORT

(75) Inventors: Daxiang Wang, Ponca City, OK (US); Tianyan Niu, Ponca City, OK (US); Gloria I. Straguzzi, Ponca City, OK (US); Harold A. Wright, Ponca City, OK (US); Robin G. Cnossen, Ponca City, OK (US)

(73) Assignee: ConocoPhillips Company, Houston, TX (US)

(*) Notice: Subject to any disclaimer, the term of this patent is extended or adjusted under 35 U.S.C. 154(b) by 346 days.

(21) Appl. No.: 10/210,353

(22) Filed: Aug. 1, 2002

(65) Prior Publication Data

US 2004/0023797 A1 Feb. 5, 2004

(51) Int. Cl.[7] .......................... B01J 23/00; B01J 23/40; B01J 23/42; B01J 23/56; B01J 23/44
(52) U.S. Cl. .......................... 502/325; 502/326; 502/327; 502/332; 502/333; 502/334; 502/335; 502/336; 502/337; 502/338; 502/339; 502/349; 502/350; 502/351; 502/353; 502/355; 502/439; 502/407; 502/415; 502/302; 502/258; 502/259; 502/260; 502/261; 502/262
(58) Field of Search .............................. 502/325–327, 502/332–339, 349–351, 353, 355, 439, 407, 415, 302–303, 258–262

(56) References Cited

U.S. PATENT DOCUMENTS

| | | | | |
|---|---|---|---|---|
| 4,024,079 A | * | 5/1977 | Okuyama et al. | 502/216 |
| 4,045,371 A | * | 8/1977 | Wheelock et al. | 502/400 |
| 4,070,413 A | | 1/1978 | Imai | 260/683.3 |
| RE29,771 E | * | 9/1978 | Cull et al. | 252/455 R |
| 4,139,496 A | * | 2/1979 | Dorawala et al. | 502/315 |
| 4,234,456 A | * | 11/1980 | Kamiya et al. | 502/405 |
| 4,395,328 A | * | 7/1983 | Hensley et al. | 208/251 H |
| 4,399,057 A | | 8/1983 | Hensley et al. | 252/435 |
| 4,559,321 A | * | 12/1985 | Slaugh | 502/263 |
| 4,755,499 A | * | 7/1988 | Neal et al. | 502/415 |
| 4,781,818 A | | 11/1988 | Reagan et al. | 208/251 |
| 5,001,097 A | | 3/1991 | Pecoraro | 502/68 |
| 5,160,601 A | | 11/1992 | Pecoraro | 208/120 |
| 5,217,940 A | * | 6/1993 | Halabi et al. | 502/355 |
| 5,498,586 A | * | 3/1996 | Dai et al. | 502/313 |
| 5,545,602 A | * | 8/1996 | Nelson et al. | 502/314 |
| 5,658,497 A | | 8/1997 | Kumar et al. | 252/373 |
| 6,030,915 A | | 2/2000 | De Boer | 502/39 |
| 6,030,921 A | * | 2/2000 | Ziemer | 502/325 |
| 6,197,719 B1 | | 3/2001 | Choudhary et al. | 502/300 |
| 6,576,588 B2 | * | 6/2003 | Ryu et al. | 502/331 |
| 6,673,743 B2 | * | 1/2004 | Lok | 502/337 |
| 6,706,660 B2 | * | 3/2004 | Park | 502/304 |
| 6,740,615 B2 | * | 5/2004 | Zhou | 502/29 |

FOREIGN PATENT DOCUMENTS

| | | | | |
|---|---|---|---|---|
| EP | 0974550 | 1/2000 | | C01B/3/40 |
| GB | 1379847 | 1/1975 | | B01J/23/84 |
| WO | WO 01/36323 | 5/2001 | | C01B/3/40 |

OTHER PUBLICATIONS

European Search Report for Application No. 03 25 4831 dated Oct. 31, 2003 (2 p.).

* cited by examiner

*Primary Examiner*—Cam N. Nguyen
(74) *Attorney, Agent, or Firm*—Conley Rose P.C.

(57) ABSTRACT

A pretreatment method for increasing the average pore size of a catalyst support is disclosed which increases the diffusivity and effectiveness factor $\eta$. The pretreatment method includes calcining the support in moisturized air at an elevated temperature sufficient to increase the average pore size. In some embodiments, the support may be treated with an acidic/basic solution prior to the calcination step. Alternatively, the calcination step may occur in a gas mixture including water/air/acidic (or basic) gases.

37 Claims, 3 Drawing Sheets

HYDROTHERMAL PRETREATMENT FOR INCREASING AVERAGE PORE SIZE IN A CATALYST SUPPORT

CROSS-REFERENCE TO RELATED APPLICATIONS

None

FIELD OF THE INVENTION

The present invention relates to a method for the production of synthesis gas, i.e., a mixture of carbon monoxide and hydrogen. Particularly, this invention relates to a method for pretreating a partial oxidation catalyst. More particularly, this invention relates to a pretreatment method for increasing the average pore size of a catalyst support.

BACKGROUND OF THE INVENTION

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive.

To improve the economics of natural gas use, much research has focused on methane as a starting material for the production of higher hydrocarbons and hydrocarbon liquids. The conversion of methane to hydrocarbons is typically carried out in two steps. In the first step, methane is reformed with water to produce carbon monoxide and hydrogen (i.e., synthesis gas or syngas). In a second step, the syngas is converted to hydrocarbons, for example, using the Fischer-Tropsch process to provide fuels that boil in the middle distillate range, such as kerosene and diesel fuel, and hydrocarbon waxes. Present day industrial use of methane as a chemical feedstock typically proceeds by the initial conversion of methane to carbon monoxide and hydrogen by either steam reforming, which is the most widely used process, or by dry reforming. Steam reforming proceeds according to Equation 1.

$$CH_4 + H_2O \Leftrightarrow CO + 3H_2 \qquad (1)$$

Although steam reforming has been practiced for over five decades, efforts to improve the energy efficiency and reduce the capital investment required for this technology continue.

The partial oxidation of hydrocarbons, e.g., natural gas or methane is another process that has been employed to produce syngas. While currently limited as an industrial process, partial oxidation has recently attracted much attention due to significant inherent advantages, such as the fact that significant heat is released during the process, in contrast to the steam reforming processes, which are endothermic. Partial oxidation of methane proceeds exothermically according to the following reaction stoichiometry:

$$CH_4 + 1/2 O_2 \Rightarrow CO + 2H_2 \qquad (2)$$

In the catalytic partial oxidation processes, natural gas is mixed with air, oxygen or oxygen-enriched air, and is introduced to a catalyst at elevated temperature and pressure. The partial oxidation of methane yields a syngas mixture with a $H_2$:CO ratio of 2:1, as shown in Equation 2. This ratio is more useful than the $H_2$:CO ratio from steam reforming for the downstream conversion of the syngas to chemicals such as methanol and to fuels. Furthermore, oxidation reactions are typically much faster than reforming reactions. This makes possible the use of much smaller reactors for catalytic partial oxidation processes. The syngas in turn may be converted to hydrocarbon products, for example, fuels boiling in the middle distillate range, such as kerosene and diesel fuel, and hydrocarbon waxes by processes such as the Fischer-Tropsch synthesis.

The selectivities of catalytic partial oxidation to the desired products, carbon monoxide and hydrogen, are controlled by several factors, but one of the most important of these factors is the choice of catalyst composition. Difficulties have arisen in the prior art in making such a choice economical. Typically, catalyst compositions have included precious metals and/or rare earths. The large volumes of expensive catalysts needed by the existing catalytic partial oxidation processes have placed these processes generally outside the limits of economic justification.

A number of process regimes have been described in the literature for the production of syngas via catalyzed partial oxidation reactions. The noble metals, which typically serve as the best catalysts for the partial oxidation of methane, are scarce and expensive. The more widely used, less expensive, catalysts have the disadvantage of promoting coke formation on the catalyst during the reaction, which results in loss of catalytic activity. Moreover, in order to obtain acceptable levels of conversion of gaseous hydrocarbon feedstock to CO and $H_2$ it is typically necessary to operate the reactor at a relatively low flow rate, or space velocity, using a large quantity of catalyst. For successful operation at commercial scale, however, the catalytic partial oxidation process must be able to achieve a high conversion of the methane feedstock at high gas hourly space velocities, and the selectivity of the process to the desired products of carbon monoxide and hydrogen must be high. Such high conversion and selectivity must be achieved without detrimental effects to the catalyst, such as the formation of carbon deposits ("coke") on the catalyst, which severely reduces catalyst performance.

As a result, substantial effort has been devoted in the art to the development of economical catalysts allowing commercial performance without coke formation. Not only is the choice of the catalyst's chemical composition important, the physical structure of the catalyst and catalyst support structures must possess mechanical strength, in order to function under operating conditions of high pressure and high flow rate of the reactant and product gasses.

Of the methods that employ catalysts for oxidative conversion of methane to syngas, typically catalytic metals are dispersed throughout a porous support. The porous support provides longitudinal channels or passageways that permit high space velocities with a minimal pressure drop. In ideal conditions, the catalytic metals are dispersed throughout the porous channels and promote further conversion.

There is a continuing need for better, more economical processes and catalysts for the catalytic partial oxidation of hydrocarbons, particularly methane, or methane containing feeds, in which the catalyst retains a high level of activity and selectivity to carbon monoxide and hydrogen under conditions of high gas space velocity and elevated pressure.

As is known, in a diffusion-limited heterogeneous process, the contribution of internal active surface areas is defined with an effectiveness factor ($\eta$) that has a value ranging from 0 to 1. The effectiveness factor ($\eta$) is determined by the intrinsic reaction kinetics and mass transfer coefficients, and can be expressed as a function of the Thiele modulus ($\Phi$), which in turn is given by Equation 3:

$$\Phi = L \sqrt{r/D_{eff}} \qquad (3)$$

where L is the diffusion distance (e.g. radius for sphere); r is the intrinsic reaction rate, and $D_{eff}$ is the effective diffusion coefficient of the reactants. The effectiveness factor ($\eta$) is related to the Thiele modulus as shown in FIG. 1.

As indicated in FIG. 1, the effectiveness factor ($\eta$) can be increased by decreasing the Thiele modulus ($\Phi$). In porous materials, the effective diffusion coefficient ($D_{eff}$) is a function of gas property and material porosity (pore volume and pore size distribution). This relationship is qualitatively illustrated in FIG. 2.

As indicated in FIG. 2, the effective diffusion coefficient ($D_{eff}$) can be increased by increasing pore size. For example, for pores in the range of 1–100 nm, increasing pore size by 10-fold can roughly increase $D_{eff}$ by an order of 10, which decreases $\Phi$ value 3-fold. As the result, the effectiveness factor ($\eta$) can be increased substantially.

SUMMARY OF THE INVENTION

Recently, it has been suggested that in many reactors, such as short contact time reactors, syngas production is a mass transfer controlled process. Consequently, use of supports with small internal pores leads to insufficient use of catalyst because (i) the reactants do not have enough time to reach catalytic metals in the pores and (ii) the reactants may become trapped in the pores and interact in undesired secondary reactions during the diffusion of CO and $H_2$ from the pores.

In a preferred embodiment of the present invention, a method of pretreating a catalyst support is disclosed which alters the pore structure of the support, increasing the diffusivity and thus also the effectiveness factor $\eta$. The preferred pretreatment method includes calcining the support in moisturized air at an elevated temperature sufficient to increase the average pore size. In some embodiments, the support may be treated with an acidic/basic solution prior to the calcination step. Alternatively, the calcination step may occur in a gas mixture including water/air/acidic (or basic) gases.

In another preferred embodiment, a partial oxidation catalyst includes a porous support and a catalytically active metal dispersed on the support, wherein the support has been calcined in moisturized air at an elevated temperature sufficient to increase the average pore size.

In still another preferred embodiment, a method for preparing a partial oxidation catalyst includes calcining a support material in moisturized air at an elevated temperature sufficient to increase the average pore size and loading the support material with a catalytically effective amount of a precious metal to form the partial oxidation catalyst. In some embodiments, the partial oxidation catalyst is reduced in hydrogen.

These and other embodiments, features and advantages of the present invention will become apparent with reference to the following description.

BRIEF DESCRIPTION OF THE FIGURES

A better understanding of the present invention can be obtained when the following detailed description of the preferred embodiment is considered in conjunction with the following drawings:

in FIG. 3 and 900° C. in FIG. 4.

DETAILED DESCRIPTION OF THE PREFERRED EMBODIMENTS

Figure 1:
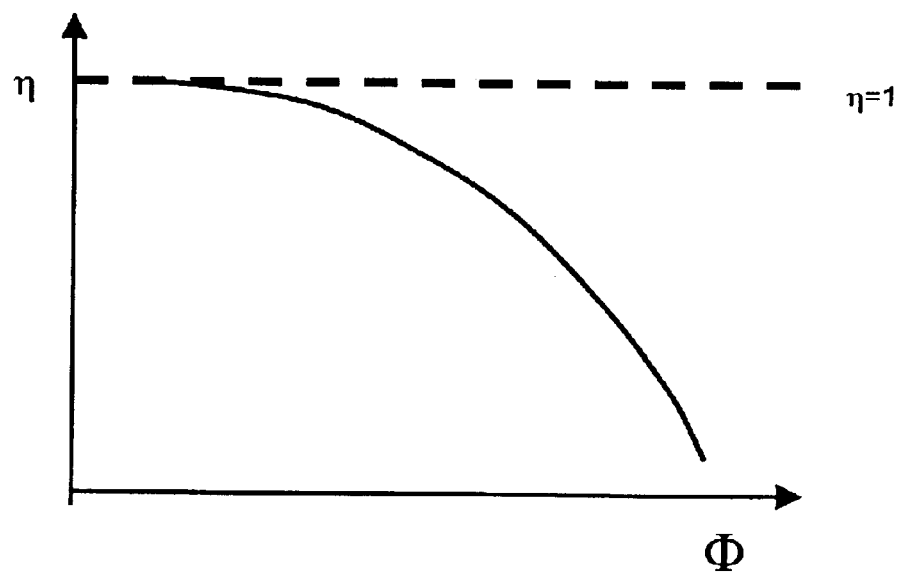
FIG. 1 is a graph illustrating the relationship between the effectiveness factor $\eta$ and the Thiele modulus $\Phi$.
Figure 2:
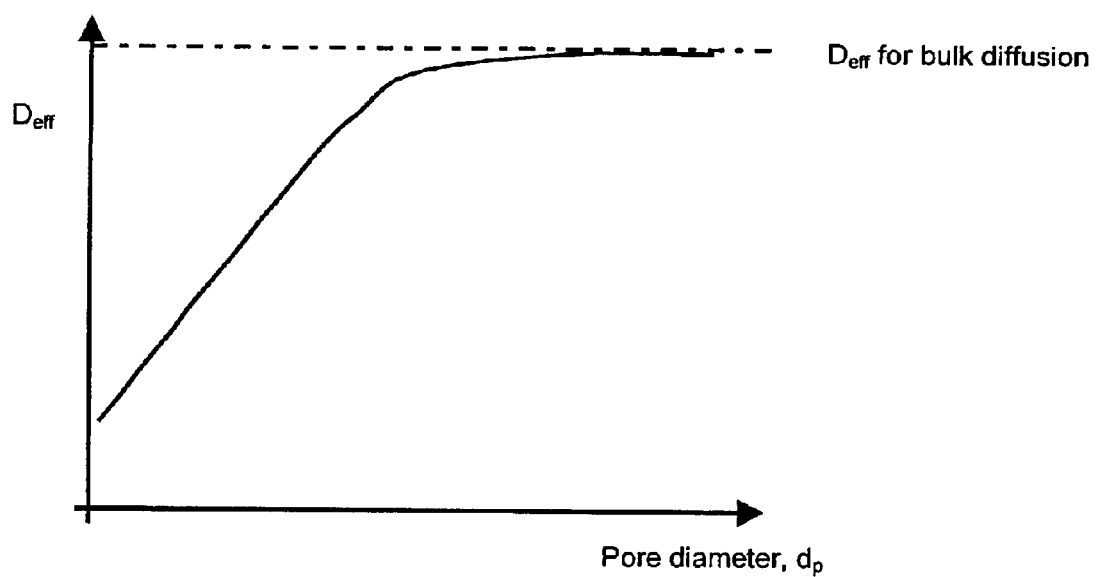
FIG. 2 is graph illustrating the relationship between the effective diffusion coefficient $D_{eff}$ and the pore radius.

The intrinsic rate of a chemical reaction can be totally obscured when a reaction is mass transport limited. For reaction to take place in a two phase system (i.e. gas-solid system), the following steps must occur: 1) transport of the gaseous reactant to the surface of a catalyst particle, 2) diffusion of the reactants into the pore structure of the catalyst particle, 3) chemisorption of reactants, chemical reaction, desorption of products, and 4) diffusion of the products out of the pore structure of the catalyst particle.

The rate of reaction will be affected by different process variables, depending on which step is rate-limiting. A reaction controlled by pore diffusion-chemical reaction (i.e. the rate of reactant diffusion and chemical reaction within the catalyst particle) will be influenced mainly by temperature, reactant concentration, percent metal on the support, number and location of active catalytic sites, catalyst particle size distribution and pore structure.

The present invention includes a method of pretreating a catalyst support by calcining the support in moisturized air at an elevated temperature sufficient to increase the stabilized average pore size. The moisturized air may be introduced to the support in various forms including steam and/or water. In a preferred embodiment, the concentration of water in air is approximately 1–20%. The elevated temperature is preferably in the range from about 600 to about 1300° C., and more preferably 700 to 1000° C.

In some embodiments, the support may be treated with an acidic/basic solution prior to the calcining step. Suitable acidic/basic solutions include HCl, $HNO_3$, and $NH_4OH$. Alternatively, the calcination step may occur in a gas mixture including water/air/acidic (or basic) gases.

Catalysts

Catalysts prepared according to the present methods preferably include a meso/macroporous support material, a catalytically active metal, and optionally, a promoter metal. Mesopores are herein defined as pores between 10 and 100 Å in diameter; and macropores are pores greater than 100 Å in diameter. In some embodiments the support is fabricated from a refractory material. Suitable refractory support materials include alumina, stabilized aluminas, zirconia, stabilized zirconias (PSZ), titania, yttria, silica, niobia, and vanadia. In a preferred embodiment, the support is alumina, zirconia, or a combination thereof.

The catalysts of the present invention may be prepared by any of the methods known to those skilled in the art. By way of illustration and not limitation, such methods include impregnating the catalytically active compounds or precursors onto the support material, extruding one or more catalytically active compounds or precursors together with the support material to prepare catalyst extrudates, and/or precipitating the catalytically active compounds or precursors onto the support material. Accordingly, the supported catalysts of the present invention may be used in the form of powders, particles, discrete structures, monoliths, honeycombs, packed beds, foams, aerogels, or another manufactured configurations.

In some embodiments, the present catalysts are provided in the form of a plurality of distinct or discrete structures or particulates. The terms "distinct" or "discrete" structures or units, as used herein, refer to noumonolithic supports in the form of divided materials such as granules, beads, pills, pellets, cylinders, trilobes, extrudates, spheres or other rounded shapes, or other manufactured configurations. Alternatively, the particulate material may be in the form of irregularly shaped particles. Wherein discrete catalyst structures are used, it is preferred that at least a majority (i.e., >50%) of the particles or distinct structures have a maximum characteristic length (i.e., longest dimension) of less than six millimeters, preferably less than three millimeters.

Another component of the catalyst of the present invention is the catalytic metal. The catalytic metal is preferably selected from Group VIII noble metals. Each of the catalytic metals can be used individually or in combination with other metals.

Optionally, the catalyst of the present invention may also comprise one or more additional promoters or modifiers such as are known to those skilled in the art. Suitable promoters include at least one metal selected from the group consisting of lanthanide Group rare earth metals.

These pretreated catalysts are capable of catalytically converting $C_1$–$C_5$ hydrocarbons (e.g., methane or natural gas) to synthesis gas containing CO and $H_2$. The inventors demonstrate that the new catalyst structures, when prepared as described in the following examples, are highly active syngas production catalysts Without wishing to be restricted to a particular theory, the inventors believe that by altering the pore structure of the support so that meso/macropores are created and micropores are reduced or eliminated, the diffusivity and effectiveness factor η will be increased. Micropores are herein defined as pores less than 10 Å in diameter. Benefits resulting from the new pore structure include i) limiting of secondary reactions; ii) more efficient use of catalytic precious metals can be obtained; and iii) the deactivation rate of the catalyst is decreased.

Process of Producing Synthesis Gas

For the production of syngas, any suitable reaction regime may be applied in order to contact the reactants with one of the new meso/macroporous supported catalysts described above. One suitable regime is a fixed bed reaction regime, in which the catalyst is retained within a reaction zone in a fixed arrangement, using fixed bed reaction techniques that are well known and have been described in the literature. A hydrocarbon and $O_2$-containing reactant gas mixture is contacted with one of the new meso/macroporous supported catalysts in a reaction zone maintained at partial oxidation-promoting conditions of temperature, pressure and flow rate, effective to produce an effluent stream comprising carbon monoxide and hydrogen. Preferably a short or millisecond contact time reactor is employed. Several schemes for carrying out catalytic partial oxidation (CPOX) of hydrocarbons in a short contact time reactor have been described in the literature and one of ordinary skill in the art will understand the operation of short contact time reactors and the applicability of the present invention thereto.

Generally, methane and an $O_2$-containing feedstock are combined to provide the reactant gas mixture. Natural gas, or other light hydrocarbons having from 2 to 5 carbon atoms, and mixtures thereof, also serve as satisfactory feedstocks. The $O_2$ containing feedstock is preferably pure oxygen gas, but it may also be air or $O_2$-enriched air. In addition, the oxygen-containing gas may also comprise steam and/or $CO_2$ in addition to oxygen. The reactant gas mixture is fed into a reactor where it comes into contact with a catalytically effective amount of metal carried on a meso/macroporous support. Representative catalysts are described in the foregoing Examples. The reactant gas mixture passes over the catalyst at a gas hourly space velocity of at least about 20,000 $hr^{-1}$, which corresponds to a weight hourly space velocity (WHSV) of about 200 $hr^{-1}$, when the reactor is operated to produce synthesis gas. The hydrocarbon feedstock and/or the oxygen-containing gas may be pre-heated before contacting the catalyst, preferably the reactant gas mixture is pre-heated to a temperature of about 50–500° C., more preferably about 300° C. Catalytically inert porous ceramic foam monoliths are preferably placed before and after the catalyst as radiation shields. The inlet radiation shield also typically aids in uniform distribution of the feed gases into the catalyst zone.

The reactant gas mixture passes over the catalyst and the catalytic materials are heated to the point at which they ignite and start the reaction. An autothermal net catalytic partial oxidation reaction preferably ensues, and the reaction conditions are managed so as to promote continuation of the autothermal process. For the purposes of this disclosure, the term "net partial oxidation reaction" means that the partial oxidation reaction shown in Reaction (2), above, predominates. However, other reactions such as steam reforming (see Reaction 1), dry reforming (Reaction (4)) and/or water-gas shift (Reaction (5)) may also occur to a lesser extent.

$$CH_4 + CO_2 \Leftrightarrow 2CO + 2H_2 \tag{4}$$

$$CO + H_2O \Leftrightarrow CO_2 + H_2 \tag{5}$$

The relative amounts of the CO and $H_2$ in the reaction product mixture resulting from the catalytic net partial oxidation of the methane, or natural gas, and oxygen feed mixture are about 2:1 $H_2$:CO, similar to the stoichiometric amounts produced in the partial oxidation reaction of Reaction (2). As the preheated feed gas mixture passes over the catalyst to the point at which they ignite, an autothermal net partial oxidation reaction ensues. Preferably, the reaction conditions are maintained to promote continuation of the autothermal net catalytic partial oxidation process.

For the purposes of this disclosure, "autothermal" means that after catalyst ignition, no additional heat must be supplied to the catalyst in order for the production of synthesis gas to continue. Autothermal reaction conditions are promoted by optimizing the concentrations of hydrocarbon and $O_2$ in the reactant gas mixture, preferably within the range of about a 1.5:1 to about 2.3:1 ratio of carbon:oxygen. The hydrocarbon:oxygen ratio is an important variable for maintaining the autothermal reaction and the desired product selectivities, although maintaining the desired temperature, for example, may in some instances require variation of the carbon:oxygen ratio. Pressure, residence time, amount of feed preheat and amount of nitrogen dilution, if used, also affect the reaction products. The process preferably includes maintaining a catalyst residence time of no more than approximately 10 milliseconds for the reactant gas mixture. This is accomplished by passing the reactant gas mixture over the catalyst at a gas hourly space velocity of about 20,000–100,000,000 $h^{-1}$, preferably about 50,000–6,000,000 $h^{-1}$. This range of preferred gas hourly space velocities corresponds to a weight hourly space velocity of about 500 to 60,000 $hr^{-1}$.

Under near optimal reaction conditions, a preferred catalyst catalyzes the net partial oxidation of at least 90% of a methane feedstock to CO and $H_2$ with a selectivity for CO and $H_2$ products of at least about 90% CO and 85% $H_2$. Maintaining autothermal reaction promoting conditions may include keeping the temperature of the catalyst at about 600–1,300° C., and preferably between about 700–1,000° C., and maintaining a reactant gas pressure of about 100–12,500 kPa, preferably about 130–10,000 kPa, while contacting the catalyst. Near ideal operating conditions also include mixing a methane-containing feedstock and an $O_2$-containing feedstock together in a carbon:oxygen ratio of about 1.5:1 to about 2.2:1, and preferably about 2:1. Preferably the methane-containing feedstock is at least about 50% methane by volume, more preferably at least 80% methane. Natural gas is mostly methane, but it can also contain up to about 25 mole % ethane, propane, butane and higher hydrocarbons. The new syngas generation process is suitable for the conversion of gas from naturally occurring reserves of methane, which can also contain carbon dioxide, nitrogen, hydrogen sulfide, and other minor components. The product gas mixture emerging from the reactor preferably has the desired Fischer-Tropsch syngas feed $H_2$:CO ratio of 2:1.

Without further elaboration, it is believed that one skilled in the art can, using the description herein, utilize the present invention to its fullest extent. The following embodiments are to be construed as illustrative, and not as constraining the scope of the present invention in any way whatsoever.

Catalyst Preparation

Step 1: Pretreatment of Supports 20 g of a commercial granular zirconia sample was loaded in a tubular furnace and heated to 120° C. in flowing air at 100 ml/min. The air was switched to pass through a water saturator at 70° C. and the furnace was heated to 700° C. at 5° C./min and held at 700° C. for 16 hours. The sample was named ZW700.

Another 20 g of a commercial granular zirconia sample was loaded in the tubular furnace and heated to 120° C. in flowing air at 100 ml/min. The air was switched to pass through the water saturator at 70° C. and the furnace was heated to 900° C. at 5° C./min and held at 900° C. for 16 hours. The sample was named ZW900.

For comparison, two 20 g control samples of commercial granular zirconia were treated the under the same conditions as samples ZW700 and ZW900, except that dry air was used. These samples were named ZD700 and ZD900, respectively.

Step 2: Catalyst Preparation 1.183 g $Sm(NO_3)_3.5H_2O$ purchased from Sigma-Aldrich was dissolved in sufficient water to form an aqueous solution. Pretreated zirconia granules comprising ZW700, ZW900, ZD700, or ZD900 (16–20 mesh) were immersed in the solution for wet impregnation. The solution was allowed to dry on a hot plate. The material was calcined in air according to the following schedules: 5° C./min ramp to 325° C., 325° C. hold for 1 hour, 5° C./min ramp to 700°hold for 2 hours, cool down to room temperature.

1.4862 g $RhCl_x.xH2O$ purchased from Sigma-Aldrich was dissolved in sufficient water to form an aqueous solution. The calcined samarium-coated granules were immersed in the rhodium-solution for wet impregnation. The solution was allowed to dry on a hot plate. The material was calcined in air according to the following schedules: 5° C./min ramp to 325° C., 325° C. hold for 1 hour, 5° C./min ramp to 700° C., 700° C. hold for 2 hours, cool down to room temperature. The material was reduced at 500° C. for 3 hours with 300 mL/min $H_2$ and 300 mL/min $N_2$.

The resulting catalysts are listed in Table 1.

TABLE 1

| \multicolumn{3}{c|}{Prepared Catalysts} | | |
|---|---|---|
| Sample | Support | Composition |
| CZW700 | ZW700 | 5.46% Rh/4.18% Sm |
| CZW900 | ZW900 | 5.49% Rh/4.38% Sm |
| CZC | Zirconia without pretreatment | N/A |

Support Characterization

The pore structures of the zirconia samples after various pretreatments were analyzed with a standard nitrogen adsorption method. For comparison purposes, the pore size data of the sample without pretreatment (CZC) and the samples pretreated in dry air at 700° C. and 900° C. (ZD700, ZD900) are listed in Table 2 and illustrated in FIGS. 3 and 4.

TABLE 2

| \multicolumn{6}{c|}{Zirconia Pore Structure} | | | | | |
|---|---|---|---|---|---|
| Sample | Composition | BET ($m^2$g) | BJH Desorption SA of pores 1.7–300 nm ($m^2$/g) | BJH Desorption Pore Volume of pores 1.7–300 nm (cc/g) | BJH Desorption Average Pore Diameter (4V/A) (nm) |
| CZC | No Pretreatment | 33 | 44 | 0.14 | 13 |
| ZD700 | Dry air @ 700° C. | 26 | 33 | 0.13 | 16 |
| ZD900 | Dry air @ 900° C. | 12 | 15 | 0.09 | 25 |
| ZW700 | Wet air @ 700° C. | 16 | 20 | 0.13 | 26 |
| ZW900 | Wet air @ 900° C. | 10 | 11 | 0.11 | 40 |

Figure 3:
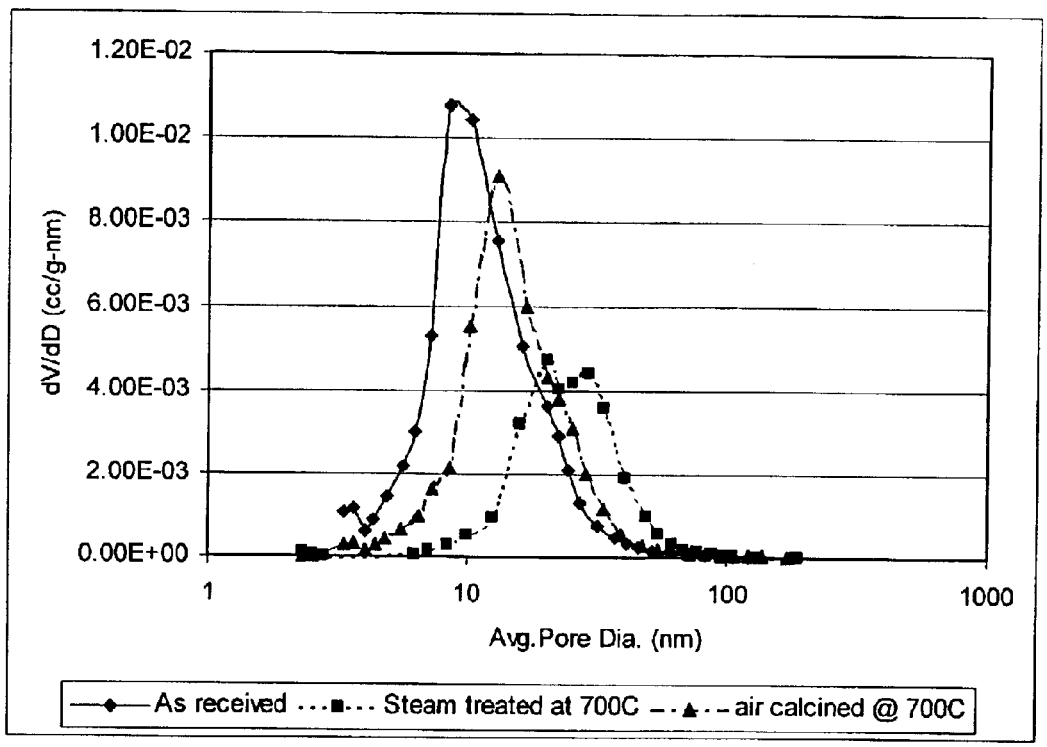
FIGS. 3 and 4 are plots in which the y-axis indicates increasing pore area and the x-axis indicates increasing pore diameter, showing pore size distribution for catalyst samples 1) received as-is (●); 2) steamed (■) at a given T; and 3) calcined (▲) at a given T, where T is 700° C.
Figure 4:
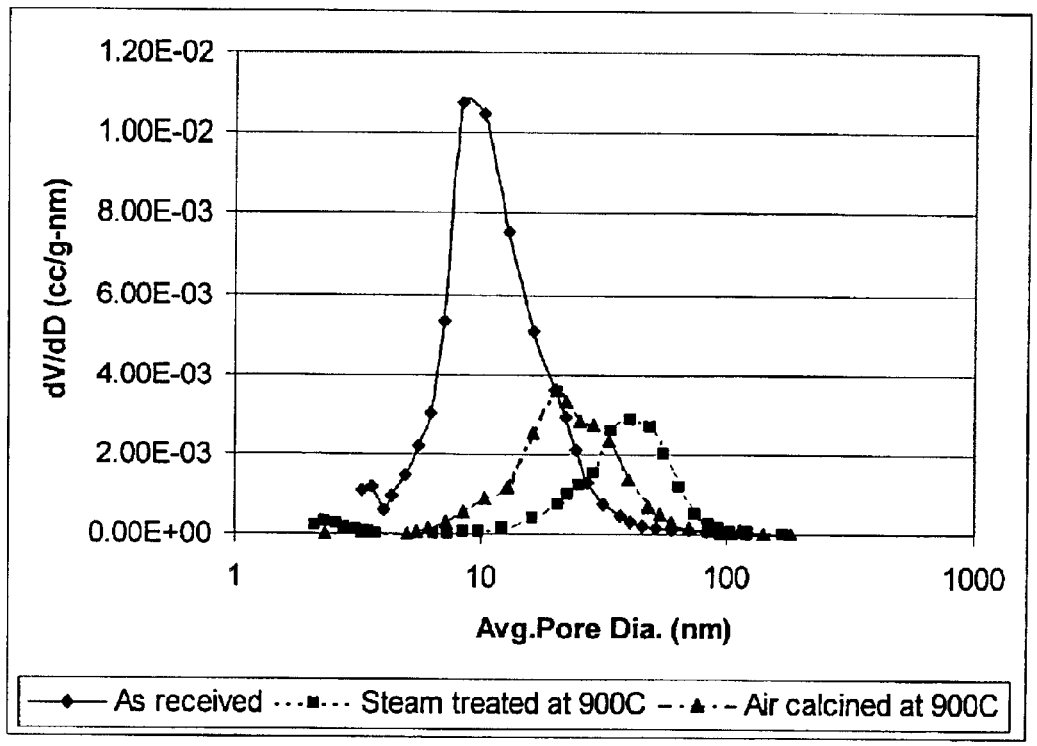

As can be seen, both Table 2 and FIGS. 3 and 4 indicate that pretreatment of the zirconia support material in moisturized air increased the average pore size.

Catalyst Performance Testing

Representative catalysts prepared as described in the foregoing "Catalyst Preparation" section were evaluated for their ability to catalyze the partial oxidation reaction in a conventional flow apparatus with a 19 mm O.D.×13 mm I.D. quartz insert embedded inside a refractory-lined steel vessel. The quartz insert contained the catalyst packed between two foam disks. The upper disk typically consisted of 65-ppi PSZ and the bottom disk typically consisted of 30-ppi zirconia-toughened alumina. The porosity and material of construction of both disks are not critical, however. Preheating the methane or natural gas that flowed through the catalyst system provided the heat needed to start the reaction. Oxygen was mixed with the methane or natural gas immediately before the mixture entered the catalyst system. The methane or natural gas was spiked with propane as needed to initiate the catalyst, then the propane was removed as soon as initiation occurred. Once the catalyst was initiated, the reaction proceeded autothermally. Two Type K thermocouples with ceramic sheaths were used to measure catalyst inlet and outlet temperatures. The molar ratio of $CH_4$ to $O_2$ was generally about 2:1, however the relative amounts of the gases, the catalyst inlet temperature and the reactant gas pressure could be varied by the operator according to the particular parameters being evaluated. The product gas mixture was analyzed for $CH_4$, $O_2$, CO, $H_2$, $CO_2$ and $N_2$ using a gas chromatograph equipped with a thermal conductivity detector. A gas chromatograph equipped with flame ionization detector analyzed the gas mixture for $CH_4$, $C_2H_6$, $C_2H_4$ and $C_2H_2$. The $CH_4$ conversion levels and the CO and $H_2$ product selectivities obtained for each catalyst evaluated in this test system (shown in Table 3) are considered predictive of the conversion and selectivities that will be obtained when the same catalyst is employed in a commercial scale short contact time reactor at least under similar conditions of reactant concentrations, temperature, reactant gas pressure and space velocity.

The initial performance (%) and deactivation rate values are calculated from the following equations:

$$CH_4 \text{ conversion}(\%): X(CH_4) = \frac{\sum(n_i \cdot [C_i]) - [CH_4]}{\sum(n_i \cdot [C_i])} \times 100\% \quad (6)$$

$$CO \text{ selectivity}(\%): S(CO) = \frac{[CO]}{\sum(n_i \cdot [C_i]) - [CH_4]} \times 100\% \quad (7)$$

$$H_2 \text{ selectivity}(\%): S(H_2) = \frac{2 \cdot [H_2]}{\sum(m_i \cdot [C_i]) - 4 \cdot [CH_4]} \times 100\% \quad (8)$$

where $[CH_4]$ is the methane molar flow in the product; $[C_i]$ is the molar flow of component i fed to the reactor; $n_i$ is the carbon number of component i; $m_i$ is the hydrogen number of component i [CO] is the molar flow of CO in the product and $[H_2]$ is the molar flow of $H_2$ in the product.

Figure 5:
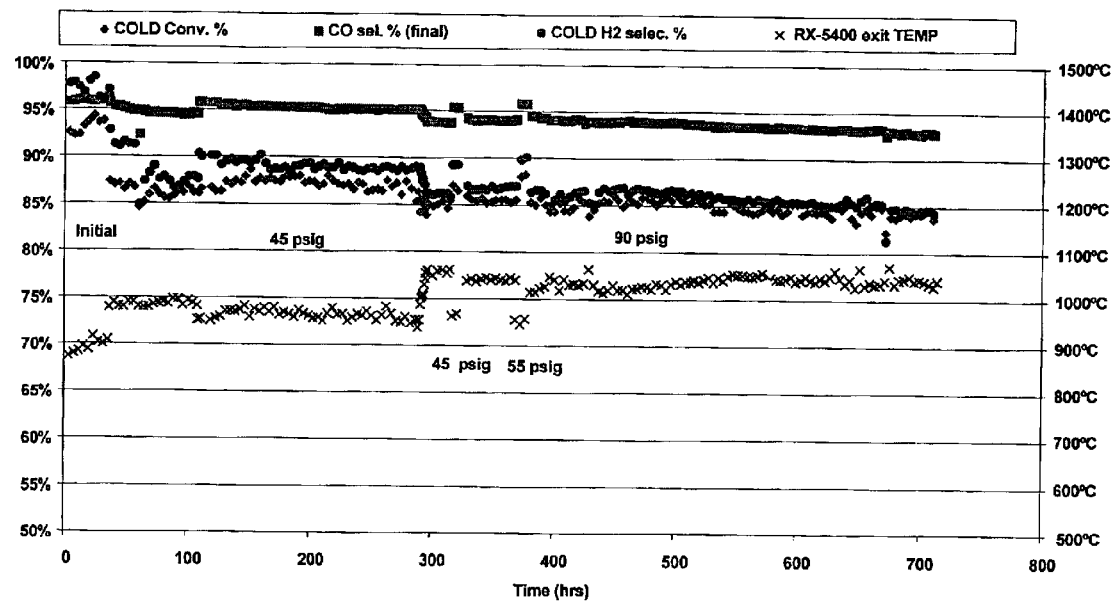
FIG. 5 is a graph illustrating the catalytic performance of sample CZW900 under partial oxidation test conditions.

The initial reaction conditions were a fuel ratio of 1.05 with a superficial velocity of 4 ft/sec with an inlet temperature of 300° C. and pressure of 45 psig. The performance is illustrated in FIG. 5 and summarized in Table 3.

TABLE 3

Performance of Representative Catalysts for Syngas Production.

| Catalyst. | Pressure (psig) | Initial performance (%) | | | Deactivation rate | |
|---|---|---|---|---|---|---|
| | | Conversion $CH_4$ | Selectivity ($H_2$) | Selectivity (CO) | Conversion ($CH_4$) | Selectivity ($H_2$) |
| CZW900 | 45 | 87.5 | 90 | 95 | 0.08 | 0.16 |
| CZW900 | 90 | 85 | 86 | 94 | 0.28 | 0.20 |
| CZW900 | 90 | 86.5 | 86 | 94 | 0.25 | 0.03 |
| CZW900 | 90 | 85 | 86.4 | 94 | 0.10 | 0.13 |
| CZC | 45 | — | — | — | 0.68 | 0.49 |

Both FIG. 5 and Table 3 show that the catalyst sample CZW900, which was prepared with a hydrothermally treated zirconia support, demonstrates high activity, selectivity and stability. Sample CZW900 converts methane at 86% conversion with 86% selectivity to hydrogen and 94% selectivity to CO. The deactivation rate of sample CZW900 is less than a half of a similar catalyst sample CZC, which was prepared with a non-pretreated commercial zirconia support. The improvement in stability alone may double the lifetime of this catalyst, increasing the syngas productivity dramatically.

While the preferred embodiments of the invention have been shown and described, modifications thereof can be made by one skilled in the art without departing from the spirit and teachings of the invention. The embodiments described herein are exemplary only, and are not intended to be limiting. For example, while the invention has been described in a syngas process, it can be translated to any meso/macroporous supported catalyst. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosures of all patents, patent applications, and publications cited herein are incorporated by reference.

What is claimed is:

1. A method for increasing the average pore size of a catalyst support, the method comprising the step of:
   calcining the support in moisturized air at an elevated temperature sufficient to increase the average pore size such that the average pore size is increased by a factor of 2 to 10 during calcination and the resulting calcined support has a total pore volume equal to or less than 0.14 cc/g.

2. The method of claim 1 wherein the moisturized air comprises a mixture of air, steam, and water.

3. The method of claim 1 wherein the moisturized air comprises a mixture of air and steam or air and water.

4. The method of claim 1 wherein the moisturized air contains from about 1 to about 20 wt. percent water.

5. The method of claim 4 wherein the elevated temperature is in the range of 600 to 1300° C.

6. The method of claim 5 wherein the elevated temperature is in the range of 700 to 1000° C.

7. The method of claim 1 further including treating the support in an acidic or basic solution prior to or during the calcination step.

8. The method of claim 7 wherein the acidic or basic solution is selected from the group consisting of HCl, $HNO_3$, and $NH_3 \cdot H_2O$.

9. The method of claim 1 wherein the average pore size is increased by a factor of 10.

10. The method of claim 1 wherein the support is selected from the group consisting of zirconia, stabilized zirconia, titania, yttria, silica, niobia, and vanadia.

11. The method of claim 1 wherein the support is zirconia or stabilized zirconia.

12. A partial oxidation catalyst comprising:
   a porous support; and
   a catalytically active metal dispersed on the support,
   wherein the support has been calcined in moisturized air at an elevated temperature sufficient to increase the average pore size by a factor of 2 to 10 during calcination and the resulting calcined support has a total pore volume equal to or less than 0.14 cc/g.

13. The catalyst of claim 12 wherein the support comprises a plurality of discrete structures.

14. The catalyst of claim 13 wherein the discrete structures are particulates.

15. The catalyst of claim 13 wherein the plurality of discrete structures comprises at least one geometry chosen from the group consisting of powders, particles, granules, spheres, beads, pills, pellets, balls, noodles, cylinders, extrudates and trilobes.

16. The catalyst of claim 13 wherein at least a majority of the discrete structures each have a maximum characteristic length of less than six millimeters.

17. The catalyst of claim 16 wherein the majority of the discrete structures each have a maximum characteristic length of less than about 3 millimeters.

18. The catalyst of claim 12 wherein the support is selected from the group consisting of alumina, zirconia, stabilized zirconia, titania, yttria, silica, niobia, and vanadia.

19. The catalyst of claim 18 wherein the support is selected from the group consisting of alumina, zirconia, and combinations thereof.

20. The catalyst of claim 12 wherein the catalytically active metal is selected from the group consisting of Group VIII B metals Os, Ir, Pt, Ru, Rh, Pd, Fe, Co, Ni, and combinations thereof.

21. The catalyst of claim 12 further including a promoter metal.

22. The catalyst of claim 21 wherein the promoter metal is selected from the group consisting of lanthanides.

23. The catalyst of claim 22 wherein the catalytically active metal is selected from the group consisting of, Group VIII B metals Os, Ir. Pt, Ru, Rh, Pd, Fe, Co, Ni, and combinations thereof.

24. The catalyst of claim 12 wherein the moisturized air comprises a mixture of air, steam, and water.

25. The method of claim 12 wherein the moisturized air comprises a mixture of air and steam or air and water.

26. The catalyst of claim 12 wherein the moisturized air contains from about 1 to about 20 wt. percent water.

27. The catalyst of claim 26 wherein the elevated temperature is in the range of 600 to 1300° C.

28. The catalyst of claim 26 wherein the elevated temperature is in the range of 700 to 1000° C.

29. The catalyst of claim 12 further including treating the support in an acidic or basic solution prior to, or during the calcination step.

30. The catalyst of claim 29 wherein the acidic or basic solution is selected from the group consisting of HCl, $HNO_3$, and $NH_3.H_2O$.

31. The catalyst of claim 12 wherein the average pore size is increased by a factor of 2.

32. The catalyst of claim 12 wherein the average pore size is increased by a factor of 10.

33. The catalyst of claim 12 wherein the catalytically active metal is selected from the group consisting of Rh, Os, Ir, Pt, Ru, Rh, Pd, and combinations thereof.

34. The catalyst of claim 12 wherein the support is selected from the group consisting of zirconia, stabilized zirconia, titania, yttria, silica, niobia, and vanadia.

35. The catalyst of claim 12 wherein the support is zirconia or stabilized zirconia.

36. A method for preparing a partial oxidation catalyst comprising, the method comprising the steps of:
   a) calcining a support material in moisturized air at an elevated temperature sufficient to increase the average pore size by a factor of 2 to 10 during calcination and the resulting calcined support has a total pore volume equal to or less than 0.14 cc/g; and
   b) loading the support material with a catalytically effective amount of a precious metal to form the partial oxidation catalyst.

37. The method of claim 36 wherein step b) is achieved through wet impregnation.

* * * * *